United States Patent
Chen

(10) Patent No.: US 7,334,459 B2
(45) Date of Patent: Feb. 26, 2008

(54) ATOMIC FORCE MICROSCOPE AND CORRECTOR THEREOF AND MEASURING METHOD

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 331 days.

(21) Appl. No.: 11/141,087

(22) Filed: May 31, 2005

(65) Prior Publication Data

US 2005/0279158 A1   Dec. 22, 2005

(30) Foreign Application Priority Data

Jun. 18, 2004   (TW) ............... 93117700 A

(51) Int. Cl.
*G02B 7/04* (2006.01)

(52) U.S. Cl. ..................................... 73/105

(58) Field of Classification Search ............... None
See application file for complete search history.

(56) References Cited

U.S. PATENT DOCUMENTS

| | | | |
|---|---|---|---|
| 6,469,288 B1 * | 10/2002 | Sasaki et al. | 250/201.3 |
| 6,823,723 B2 | 11/2004 | Vandervorst et al. | 73/105 |
| 2006/0081776 A1 * | 4/2006 | Shimada et al. | 250/307 |

* cited by examiner

*Primary Examiner*—Robert Raevis
(74) *Attorney, Agent, or Firm*—Morris Manning Martin LLP; Tim Tingkang Xia, Esq.

(57) ABSTRACT

An atomic force microscope includes a tip (12). The tip is shifted to determine a height of a surface interval (44) of an object, wherein the surface interval is substantially sloped at an angle above the horizontal and defines a point (42*a*). The atomic force microscope includes a light source (31) and an analyzer (33). The light source applies a number of light beams focused onto the point of the surface interval, and the applied light beams are reflected by the surface interval. The analyzer analyzes the reflected light beams in order to determine the angle above the horizontal.

9 Claims, 3 Drawing Sheets

ATOMIC FORCE MICROSCOPE AND CORRECTOR THEREOF AND MEASURING METHOD

FIELD OF THE INVENTION

The present invention relates to an atomic force microscope (AFM), and particularly to a corrector for correcting a shift of a tip of the AFM.

BACKGROUND

The atomic force microscope (AFM) was developed in 1986 by Binnig, Quate and Gerber. The AFM utilizes a sharp probe moving over the surface of a sample under inspection, for measuring the sample's topography and dimensions of the sample. The probe is a tip on the end of a cantilever, which bends in response to a force acting between the tip and the sample.

The force experienced by the cantilever varies depends on the degree of separation between the tip and the sample. A repulsive force dominates at small interatomic distances, and it increases exponentially with decreasing separation. On the other hand, an attractive force (van der Waals force) dominates at larger separations.

The measuring modes of the AFM are roughly classified into a contact mode and a tapping mode. In the contact mode, the AFM tip makes soft physical contact with the sample. As the tip approaches the sample surface, the interatomic forces become very strongly repulsive. Since the cantilever has a low spring constant (lower than the effective spring constant holding the atoms of the sample together), the forces will cause the cantilever to bend following the surface topography of the sample. Therefore, the detection of the position of the cantilever leads to a topographic map of the sample surface.

In most the contact mode AFMs, the position of the cantilever is detected with optical techniques. A common detecting scheme is equipping an AFM with a laser beam. The laser beam is reflected onto a position-sensitive photodetector (photodiode) by a back side of the cantilever. The AFM can generate the topographic data by operating in one of two modes: a constant-height mode or a constant-force mode. In the constant-height mode, the spatial variation of the cantilever deflection can be used directly to generate the topographic data as a scanner height is fixed during the scan.

In the constant-force mode, the deflection of the cantilever can be used as input to a feedback circuit that moves the scanner up and down in a device-defined Z-direction, responding to the topography of the sample by keeping the cantilever deflection constant. In this way, the total force applied by the cantilever onto the sample is kept constant. The constant-force mode is generally preferred for most applications.

The tapping mode is another common mode used in AFM. When operated in air or other gases, the cantilever is oscillated at its resonant frequency (often hundreds of kilohertz) and is positioned above the surface of the sample so that it only taps the surface for a very small fraction of its oscillation period. In the tapping mode, the tip still contacts the sample in the sense defined hereinabove. However, the very short time over which this contact occurs means that lateral forces are dramatically reduced as the tip scans over the surface. When imaging samples that are poorly immobilized or soft, the tapping mode may be a far better choice than the contact mode for imaging.

The AFM tip is perpendicular to the sample surface when the AFM probes the sample surface. If the sample surface is smooth, the tip-sample interatomic force is exerted to the AFM tip along the Z-direction only. Therefore, this interatomic force also bends or oscillates the cantilever along the Z-direction rather than the X- or Y-directions. Along the same Z-direction, the oscillating or bending signals of the cantilever, detected by a detector of the AFM, are actually the signals from the sample surface. Gathering and processing of the oscillating signals or bending signals by a calculator provides an accurate topographic map of the actual sample surface.

If the sample surface is not smooth but curved, the tip-sample interatomic force is exerted to the AFM tip along not only the Z-direction but also the X- or Y-directions. In this case, the tip-sample interatomic force still bends or oscillates the cantilever only along the Z-direction. As a result, the tip-sample interatomic force experienced by the cantilever is smaller than the tip-sample interatomic force experienced by the tip. However, the detector of the AFM cannot determine the difference.

The curved sample surface substantially tilts at an angle. If this angle is relatively large, the interatomic force exerted up to the AFM tip along the X- or Y-directions is also large. Such angle reduces the interatomic force along the Z-direction, and therefore decreases the accuracy of the resultant topographic map.

Thus, what is needed is an AFM which can accurately measure a curved surface topography of a sample.

SUMMARY

A first embodiment provides an atomic force microscope including a tip which is shifted to determine a height of a surface interval of an object. The surface interval is substantially sloped at an angle above the horizontal and defines a point. The atomic force microscope further includes a light source and an analyzer. The light source applies a plurality of light beams focused onto the point of the surface interval, wherein the applied light beams are reflected by the surface interval. The analyzer analyzes the reflected light beams in order to determine the angle above the horizontal.

A second embodiment provides a method for determining a height of a surface interval of an object. The surface interval defines a point scanned with an atomic force microscope having an AFM tip. The AFM tip is shifted to have a displacement when the point of the surface interval is scanned. In this method, a plurality of light beams are generated and focused onto the point of the surface interval, so that the point of the surface interval reflects the applied light beams to an analyzer.

The present invention provides the analyzer for analyzing the reflected light beams to determine an angle of the surface interval above the horizontal. The displacement divided by the cosine of the determined angle is substantially equal to a height of the surface interval.

Other advantages and novel features of the embodiments will be drawn from the following detailed description with reference to the attached drawings, in which:

DETAILED DESCRIPTION OF PREFERRED EMBODIMENTS

Figure 1:
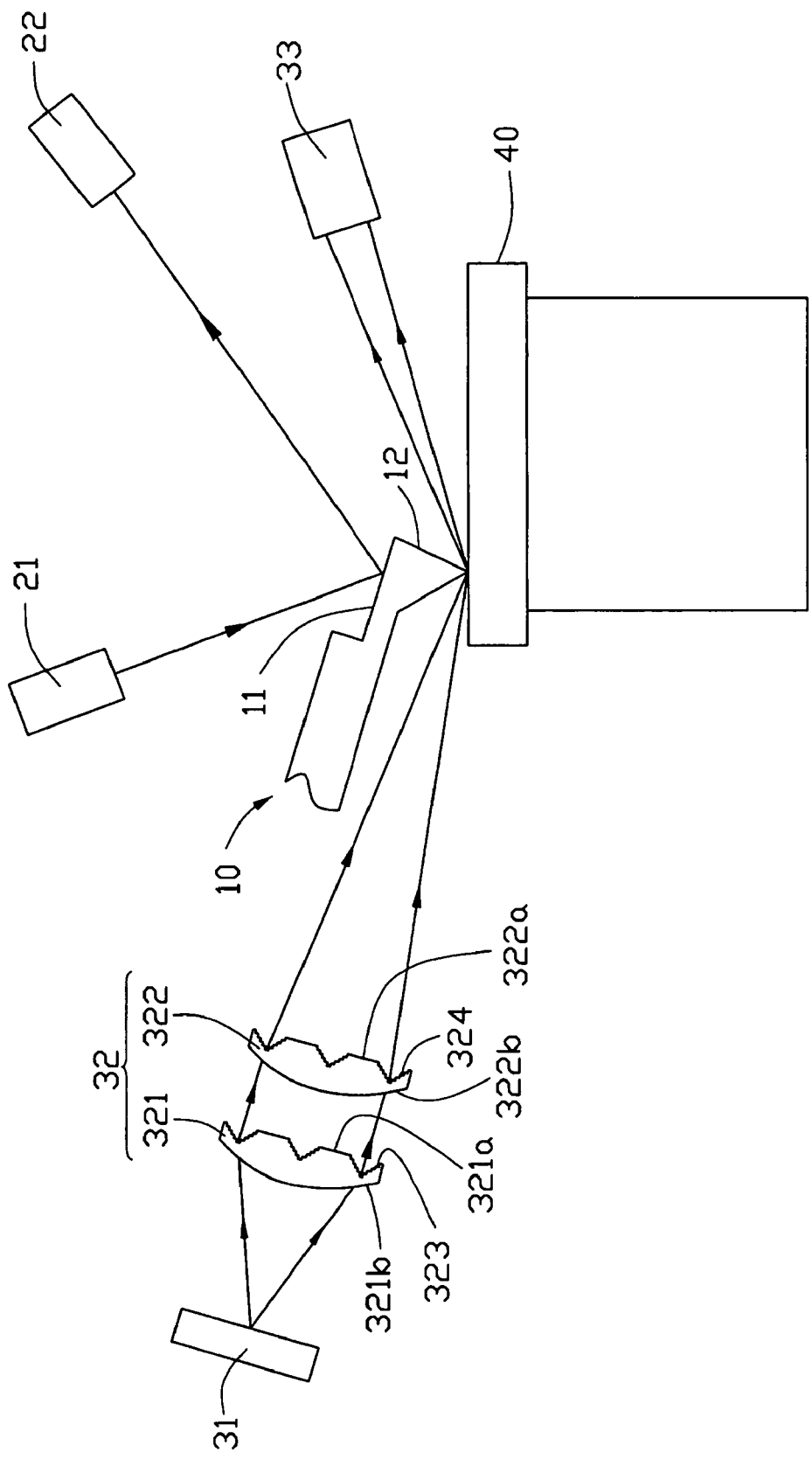
FIG. 1 is a schematic view of a corrector and an AFM in accordance with a preferred embodiment of the present invention, the corrector and the AFM being applied to analyze a sample surface of an object.

In one embodiment, the present invention provides a corrector for an AFM. Referring to FIG. 1, the AFM includes a probing assembly 10, an electronic controller (not shown), a calculator (not shown), a detecting assembly, and the corrector. These devices are electrically connected with each other. The probing assembly 10 includes a tip 12 and a cantilever 11. The detecting assembly includes a laser source 21 and a photo-detector 22. The corrector includes an analyzer 33, a focusing assembly 32, and a light source 31 (e.g., a laser). The focusing assembly 32 includes a first aspherical lens 321 and a second aspherical lens 322. The first aspherical lens 321 includes a first surface 321a and a second surface 321b. The first aspherical lens 321 further includes a plurality of first grating grooves 323 at the first surface 321a or the second surface 321b. In the illustrated embodiment, the first grating grooves 323 are at the first surface 321a. The second aspherical lens 322 includes a third surface 322a and a fourth surface 322b. The second aspherical lens 322 may further include a plurality of second grating grooves 324 at the third surface 322a or the fourth surface 322b. In the illustrated embodiment, the second grating grooves 324 are at the third surface 322a. The first and second aspherical lenses 321, 322 may be two-dimensional diffractive optical devices. In this case, the first and the second aspherical lenses 321, 322 are able to reduce aberration of a plurality of light beams (aberration is the deviation of light beams from a single focus). As a result, the light beams are precisely focused.

Additionally, the focusing assembly 32 may further include an optical reflector (not shown). The optical reflector is for changing the optical path of the light beams, in order to facilitate the arrangement of other devices of the AFM.

Figure 2:
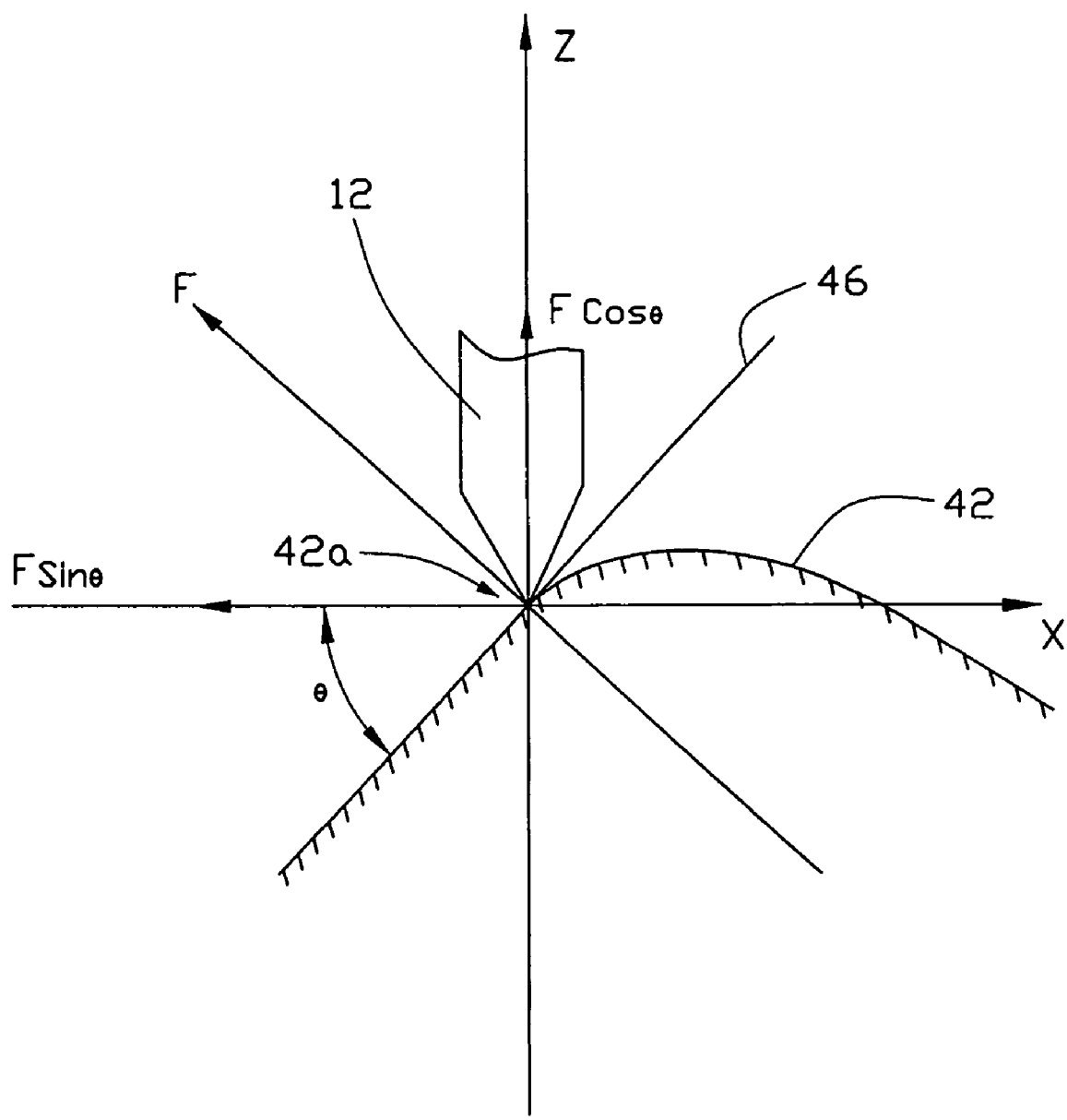
FIG. 2 is an enlarged view of the sample surface and a tip of the AFM.

Referring also to FIG. 2, the probing assembly 10 scans a sample surface 42 of an object 40 under inspection, in contact mode or tapping mode, under the control of the electronic controller. The laser source 21 emits a plurality of laser beams striking on a back side of the cantilever 11. The back side of the cantilever 11 reflects the laser beams to the photo-detector 22. When a sample surface-tip interatomic force is exerted up to the tip 12, the tip 12 is shifted by a displacement $\Delta z$, and the cantilever 11 is oscillated (in the tapping mode) or bent (in the contact mode). The oscillation or bending of the cantilever 11 changes the incident angle of the laser beams on the cantilever 11, and therefore changes the reflection angle of the laser beams.

As the cantilever 11 is oscillated or bent, the laser beams are reflected to the photo-detector 22 accordingly. The photo-detector 22 receives the changed reflected light beams, and transforms the laser beams into electrical signals. The electrical signals are input into the calculator. The calculator analyzes the electrical signals to obtain the displacement $\Delta z$ of the tip perpendicular to the sample surface 42 (i.e., along to the Z-axis of FIG. 2).

Figure 3:
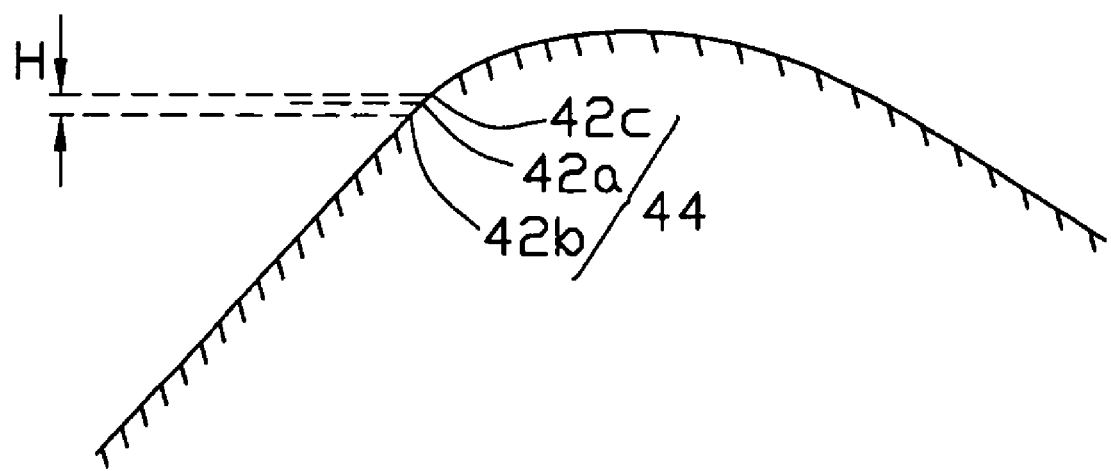
FIG. 3 is similar to FIG. 2, but showing details of points defined in relation to the sample surface.

Referring to FIG. 2 and FIG. 3, the tip 12 is shifted, in order for the AFM to determine a height H of a sloped surface interval 44. The surface interval 44 is part of the sample surface 42, and is defined to be between points 42b and 42c that are on the sample surface 42. The surface interval 44 defines a point 42a between the points 42b, 42c, and is substantially sloped at an angle $\theta$ above the horizontal (i.e., above an XY plane). Because the points 42b, 42c are close to each other, the angle $\theta$ above the horizontal is substantially equal to a tangent plane 46 at the point 42a.

When the point 42a of the surface interval 44 is scanned, the light source 31 applies a plurality of light beams onto the point 42a. Before the light beams reach the point 42a, they are focused by the first and the second aspherical lenses 321, 322. The focused light beams are reflected by the point 42a to the analyzer 33. The analyzer 33 receives the reflected light beams, and analyzes the reflected light beams to determine the angle $\theta$ above the horizontal as a modifier.

Referring to FIG. 2, the interatomic force exerted by the sample surface 42 is defined as a force F. The force F has a first component $F\sin\theta$ along the X-axis, and a second component $F\cos\theta$ along the Z-axis. The second component $F\cos\theta$ is the only effective force shifting the tip 12 of the AFM. Therefore, the displacement $\Delta z$ of the tip 12 divided by the cosine of the determined angle $\theta$ is substantially equal to the height H of the surface interval 44. In the present invention, the AFM accurately detects a surface interval 44 sloped at an angle in the range from about 0 to about 75 degrees.

In another embodiment, the present invention also provides a method for determining a height of a surface interval. Referring to FIG. 2 and FIG. 3, the surface interval 44 includes a point 42a scanned with an atomic force microscope having an AFM tip 12, wherein the AFM tip 12 is shifted to have a displacement $\Delta z$ when the point 42a is scanned. In this method, a plurality of light beams are generated and focused onto the point 42a of the surface interval 44, so that the point 42a of the surface interval 44 reflects the applied light beams to an analyzer 33 (FIG. 1). The analyzer 33 analyzes the reflected light beams to determine an angle $\theta$ of the surface interval 44 above the horizontal. The displacement divided by the cosine of the determined angle (i.e., $\Delta z / \cos\theta$) is substantially equal to a height H of the surface interval 44.

The above-described embodiments have many advantages. For example, a light source and an analyzer are provided for correcting a shift of an AFM tip when a height of a surface interval is determined. The surface interval includes a point scanned with the AFM tip. The AFM tip is shifted to have a displacement when the point of the surface interval is scanned. In operation of the light source and the analyzer, a plurality of light beams are generated and focused onto the point of the surface interval, and the light beams are reflected by the point to an analyzer. The analyzer analyzes the reflected light beams to determine the angle of the surface interval above the horizontal. The displacement divided by the cosine of the determined angle is substantially equal to the height of the surface interval. Based on this equation, an accurate topographic map of the surface interval can be obtained.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An atomic force microscope comprising a tip, wherein the tip is shifted to determine a height of a surface interval of an object, and the surface interval is substantially sloped at an angle above the horizontal and defines a point, the atomic force microscope further comprising:

a light source for applying a plurality of light beams focused onto the point of the surface interval, wherein the applied light beams are reflected by the surface interval; and an analyzer for analyzing the reflected light beams in order to determine the angle above the horizontal.

2. The atomic force microscope as described in claim 1, further comprising a first and a second lenses for focusing the light beams, wherein the first and second lenses are aspherical lenses.

3. The atomic force microscope as described in claim 2, wherein the first lens comprises a plurality of grating grooves provided at one of opposite surfaces of the first lens.

4. The atomic force microscope as described in claim 3, wherein the second lens comprises a plurality of grating grooves provided at one of opposite surfaces of the second lens.

5. A method for determining a height of a surface interval of an object, wherein the surface interval defines a point scanned with an atomic force microscope having a tip, and the tip is shifted to have a displacement when the point of the surface interval is scanned, the method comprising:

applying a plurality of light beams focused onto the point of the surface interval, so that the point of the surface interval reflects the applied light beams to an analyzer; and analyzing the reflected light beams, to determine an angle of the surface interval above the horizontal, whereby the displacement divided by the cosine of the determined angle is substantially equal to a height of the surface interval.

6. The method as described in claim 5, wherein the atomic force microscope scans the point by contacting the surface interval.

7. The method as described in claim 5, wherein the atomic force microscope scans the point by tapping the surface interval.

8. A method for correcting topography measuring of an atomic force microscope, comprising the steps of:

predetermining a surface interval of a to-be-measured object corresponding to said topography measuring;

applying light beams focused onto said surface interval;

receiving and analyzing reflected light beams from said surface interval so as to generate a modifier;

initiating said topography measuring; and correcting said topography measuring by means of said modifier.

9. The method as described in claim 8, wherein said modifier is an angle of said surface interval above a predetermined horizontal.

* * * * *